US006688451B2

(12) United States Patent
Derby et al.

(10) Patent No.: US 6,688,451 B2
(45) Date of Patent: Feb. 10, 2004

(54) MULTI-HEAD ROBOT SYSTEM AND METHOD OF USE

(76) Inventors: Stephen J. Derby, 172 Lockrow Rd., Troy, NY (US) 12180; Jeffrey M. Smith, 601 Dalton Division Rd., Pittsfield, MA (US) 01201

( * ) Notice: Subject to any disclaimer, the term of this patent is extended or adjusted under 35 U.S.C. 154(b) by 195 days.

(21) Appl. No.: 09/824,306

(22) Filed: Apr. 2, 2001

(65) Prior Publication Data

US 2001/0035331 A1 Nov. 1, 2001

Related U.S. Application Data

(60) Provisional application No. 60/195,065, filed on Apr. 5, 2000.

(51) Int. Cl.$^7$ .............................................. B65G 47/74
(52) U.S. Cl. ................. 198/346.1; 198/687.1; 198/465.4; 198/465.2
(58) Field of Search ............... 198/346.1, 687.1, 198/465.4, 465.2, 345.3, 345.6; 414/222.06

(56) References Cited

U.S. PATENT DOCUMENTS

| | | | | |
|---|---|---|---|---|
| 1,420,907 A | * | 6/1922 | Bixler | 198/465.4 |
| 2,868,354 A | * | 1/1959 | Harrison | 198/465.4 |
| 2,997,133 A | * | 8/1961 | Gehrke | 198/465.4 |
| 3,051,096 A | * | 8/1962 | Walsh et al. | 198/345.3 |
| 3,958,682 A | | 5/1976 | Martin | |
| 4,444,302 A | | 4/1984 | Dunstan | |
| 4,488,241 A | | 12/1984 | Hutchins et al. | |
| 4,603,456 A | * | 8/1986 | Hiroyasu et al. | 198/345 |
| 4,620,628 A | | 11/1986 | Greenlee | |
| 4,621,398 A | | 11/1986 | Kleiman | |
| 4,662,503 A | * | 5/1987 | Lycke | 198/472 |
| 4,718,533 A | * | 1/1988 | Nussbaumer et al. | 198/346.1 |
| 4,721,285 A | | 1/1988 | McMichael | |
| 4,746,005 A | * | 5/1988 | Bihary et al. | 198/465.1 |
| 4,823,929 A | * | 4/1989 | Fleming et al. | 198/345 |
| 4,865,514 A | | 9/1989 | Tsuchihashi et al. | |
| 4,919,586 A | | 4/1990 | Derby | |
| 4,929,009 A | | 5/1990 | Vandersluis et al. | |
| 4,954,952 A | | 9/1990 | Ubhayakar et al. | |
| 4,958,716 A | * | 9/1990 | Matsuo et al. | 198/346.1 |
| 4,982,827 A | * | 1/1991 | Seitz et al. | 198/341 |
| 5,011,366 A | | 4/1991 | Miller | |
| 5,412,863 A | * | 5/1995 | Prodel | 29/799 |
| 5,769,949 A | * | 6/1998 | Cienkus et al. | 118/621 |
| 5,781,988 A | * | 7/1998 | Faraoni et al. | 29/735 |
| 5,819,906 A | * | 10/1998 | Enderlein et al. | 198/465.4 |
| 5,921,459 A | | 7/1999 | Heraly et al. | |
| 6,382,396 B1 | * | 5/2002 | Dana et al. | 198/465.4 |
| 6,409,438 B1 | * | 6/2002 | Kohler | 409/131 |

* cited by examiner

Primary Examiner—Douglas Hess
(74) Attorney, Agent, or Firm—Schmeiser, Olsen & Watts

(57) ABSTRACT

A multi-head robotic system capable of delivering numerous robotic devices to a task site is disclosed. A number of robotic devices perform tasks simultaneously, thus tasks can be completed quickly. Each individual robot does not need to move at an extremely fast speed. The sequence in which the robotic devices arrive at or leave a task site is unlimited. The robotic delivery system is capable of "leapfrogging" robotic devices, or placing them randomly, at locations where they are most needed.

23 Claims, 12 Drawing Sheets

MULTI-HEAD ROBOT SYSTEM AND METHOD OF USE

This application claims benefit of provisional application No. 60/195,065 filed Apr. 5, 2000.

BACKGROUND OF THE INVENTION

1. Technical Field

The present invention relates generally to the field of robotics. In particular, this invention relates to a multi-head robot device, system and method, which include a number of robotic devices, each of which is able to operate independently at any of a number of discrete destinations.

2. Related Art

The field of robotics is a rapidly developing area of technology. Robotic systems are continually being adapted to operate in new market niches, and to operate at higher speeds in existing product areas. Robotics will continue to play an increasingly important role in the economic viability of existing, as well as emerging, technologies. For example, manufacture of miniature assemblies incorporating MEMS (Micro-Electro-Mechanics) devices is tedious and extremely difficult to perform efficiently for even a skilled person. Similarly repetitive and labor intensive tasks are present in many other industries, including photonics, laboratory automation, electronics assembly, food processing, material handling, and pouch singulation. Inherent in each of these processes is the need for a high speed transfer system which can repeatedly target variable locations, acquire an object, and then deposit that object at a specific location.

In general, the related art has provided a variety of robotic devices with which to address these tasks. For instance, in the field of material handling there is the task of singulation, or the separating of items one from another. Attempts have been made to increase the speed of singulation using a large number of tilted conveyors. However, this approach introduces the problem of the amount of space required to accommodate the numerous conveyors. A second approach involves computer vision systems to direct a single robot arm to pick a single package and transfer it. This approach requires a complex robot gripper, one which is capable of grasping any shape or size package.

Another example of an industry having a need for high speed transfer systems is the food processing industry. Food processing lines, such as cookie process lines, typically require that individual cookies be picked from a conveyor and either placed in a package, or prepared for further processing. Current automation takes one of two forms. The first is a series of industrial robot arms that transfer one or two cookies at a time. Many of these, typically SCARA (Selectively Compliant Articulated Robot Arm) robot arms and attendant vision systems must be employed on a single cookie conveyor to handle the volume of product. The second form of automation utilizes a spider-like device which descends to pick a cookie and then transfer it. Here again, a vision system is required, and range of motion is limited.

Finally, a governmental requirement to enhance worker safety calls for retrofitting of assembly lines to curtail ergonomic injuries caused by repetitive motions. This requirement provides further incentive for manufacturers to address the long felt need for high speed, high throughput robotic systems involving variable tasks.

However, known robotic machines are limited to the speed at which a single robotic device can be manipulated. That is, the industry is confronted by physical limitations that curb the development of machinery capable of the increases in speed necessary to meet the challenges confronting industry.

Therefore, a novel apparatus which is less complex and costly than presently available robotic systems, but which provides for increases in speed, throughput, and tasks is believed clearly desirable.

SUMMARY OF THE INVENTION

As noted initially and more fully described herein, the the present invention solves these problems in the related art by providing a multi-head robot system capable of delivering numerous robotic devices to a task site. Since a number of robotic devices are performing tasks simultaneously, the tasks can be completed quickly, and each individual robotic device need not move at an extremely fast speed. The sequence in which robotic devices arrive at or leave a task site is unlimited. That is, the robotic delivery system is capable of "leapfrogging" robotic devices, or placing them in random order, where ever they are most needed. The robotic devices typically function as material handling instruments, although other embodiments are readily available.

In a first general aspect, the present invention presents a material handling system comprising: at least one material handling device; at least one track for transporting said material handling device; a plurality of workstations located along the track; and wherein each material handling device is removably coupled to the track.

In a second general aspect, the present invention presents a system comprising: a conveyor track; at least one robot removably attached to said conveyor track; a drive system for movement of the conveyor track; at least one workstation adapted to operationally receive said robot; and a coupling mechanism to disengage or engage the robot to the conveyor track.

In a third general aspect, the present invention presents a delivery system for a robotic device comprising: a first track guide element for routing the robotic device; a conveyor track for transporting the robotic device, said conveyor track operably positioned with said fixed track guide element; at least one robotic device removably attached to said conveyor track and said guide element; a drive system for maintaining the speed of the conveyor track; at least one workstation adapted to operationally receive said robotic device from said conveyor track and said guide element; and a coupling mechanism operationally attached to the robotic device which allows the robotic device to disengage or engage the conveyor track and the guide element.

In a fourth general aspect, the present invention presents a material handling system comprising: a plurality of independent material handling devices; at least one continuously moving track for transporting said material handling devices; a drive system for maintaining said track at a constant speed; a plurality of workstations located along the route traversed by the track; and wherein each material handling device further comprises means for removably attaching itself to the track.

In a fifth general aspect, the present invention presents a delivery system for a robotic device comprising: a track guide element for routing the robotic device; at least one robotic device removably attached to said guide element, said robotic device capable of propelling itself along said guide element; at least one workstation adapted to operationally receive said robotic device from said guide element;

and a coupling mechanism operationally attached to the robotic device which allows the robotic device to disengage or engage the guide element.

In a sixth general aspect, the present invention presents a material handling system comprising: a plurality of independent material handling devices; at least one continuously moving track for transporting said material handling devices; a drive system for maintaining said track at a constant speed; a plurality of workstations located along the route traversed by the track; and wherein each material handling device further comprises a device for removably attaching the material handling device to the track.

In a seventh general aspect, the present invention presents a transport system for a docking end effector comprising: a first track; a plurality of end effectors removably coupled to said track; at least one docking station adapted to receive at least one of said end effectors; a vision system adapted to control operation of said transport system; a position sensor system adapted to control operation of said transport system; a drive system operationally connected to said track; at least one second track adapted to receive at least one end effector, said second track further adapted to provide access to the first track; a system for supplying control signals to the said end effector; a system for supplying power to said end effector; and a coupling device, said coupling device adapted to couple and decouple said end effector to the first track and the second track.

In a eighth general aspect, the present invention presents a method of distributing at least one robotic device, said method comprising: providing at least one robotic device; providing at least one track for transporting said robotic device; providing at least one workstation along the track; providing a system for removably attaching each robotic device to the track; and providing a device to mate each robotic device to a workstation.

The foregoing and other objects, features and advantages of the invention will be apparent in the following and more particular description of the preferred embodiments of the invention as illustrated in the accompanying drawings.

BRIEF DESCRIPTION OF THE DRAWINGS

The preferred embodiments of this invention will be described in detail, with reference to the following figures, wherein like designations denote like elements, and wherein.

DETAILED DESCRIPTION OF THE INVENTION

Figure 1:
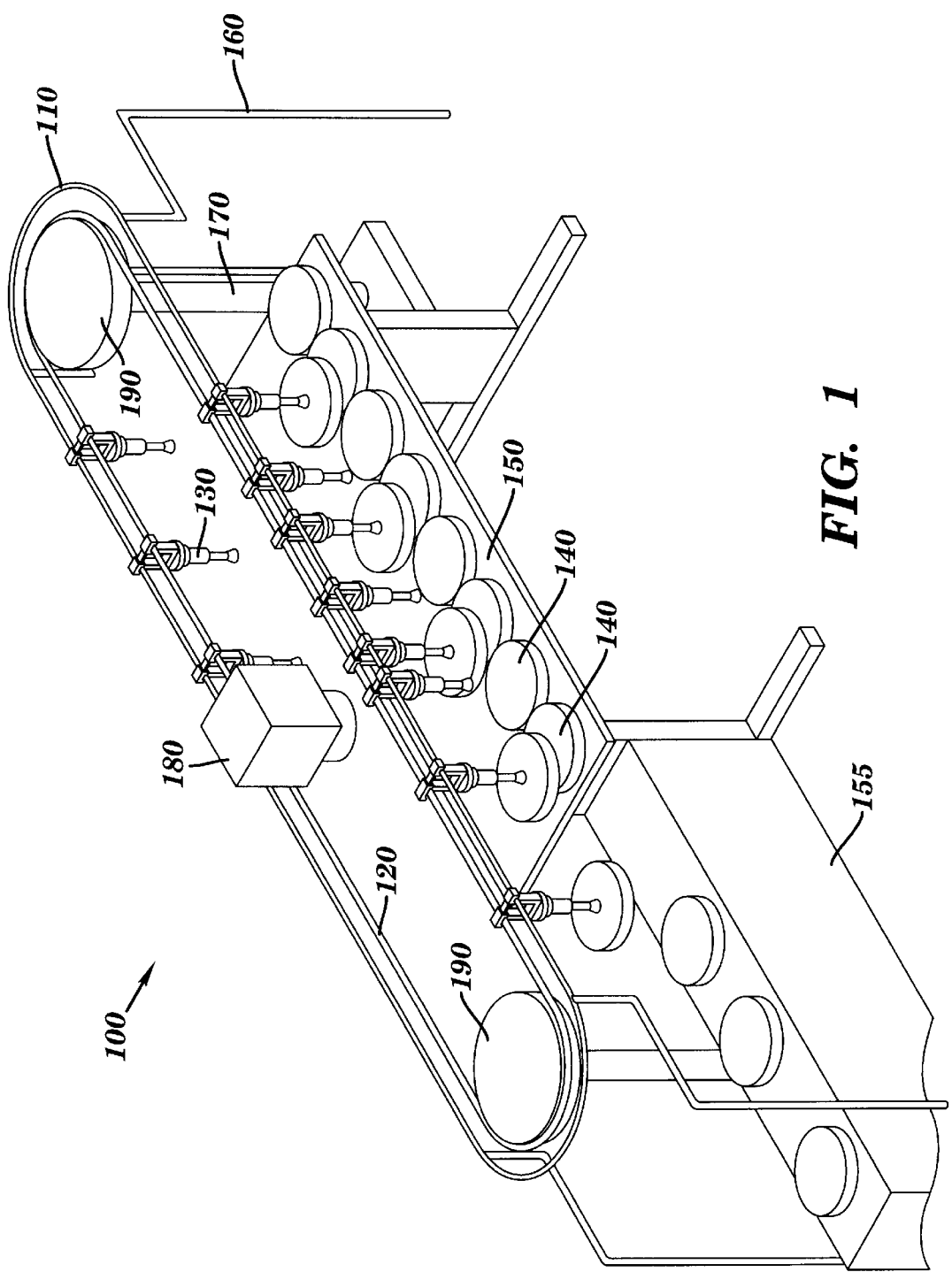
FIG. 1 is an overall perspective view of a multi-head tracked robot system capable of delivering numerous robotic devices to a task site in one embodiment of the present invention.

Referring to the drawings, FIG. 1 illustrates a first form of the present invention, that is, a multi-head robot system 100 capable of delivering numerous robotic devices 130 to a task site or first workstation 150. In the embodiment depicted in FIG. 1, a series of robotic devices 130 are shown removably attached to a drive belt 120. The drive belt 120 may be a chain, belt, cable or other suitable means for moving the robotic devices 130 along a track 110. A machine vision control system 180 monitors the location and movement of the robotic devices 130. The robotic devices rest upon the track 110, and are propelled or carried along the track by the drive belt 120. The track 110 is supported by frame members 160. Similarly, the drive belt 120 is supported by structural members 170. Finally, a plurality of work pieces 140 are located on a first workstation 150.

In a typical processing routine, robotic devices 130 are removably attached to the drive belt 120. The robotic devices 130 are also attached to the track 110 in such a manner that they may glide along track 110 when they are propelled by drive belt 120. A drive system (not shown) controls the speed and direction of drive belt 120, through driven, rotating spindles 190.

During operation, the drive belt 120 is maintained at a desired speed. The robotic devices 130 travel around the route defined by the track 110 until machine vision control system 180 or some other sensing means determines that a particular robotic device 130 is in an appropriate position to perform process steps on a particular workpiece 140. At this time, the robotic device 130 is optionally decoupled from the drive belt 120, and its end effector 210 (FIG. 2) will commence operations on the workpiece 140.

Figure 2:
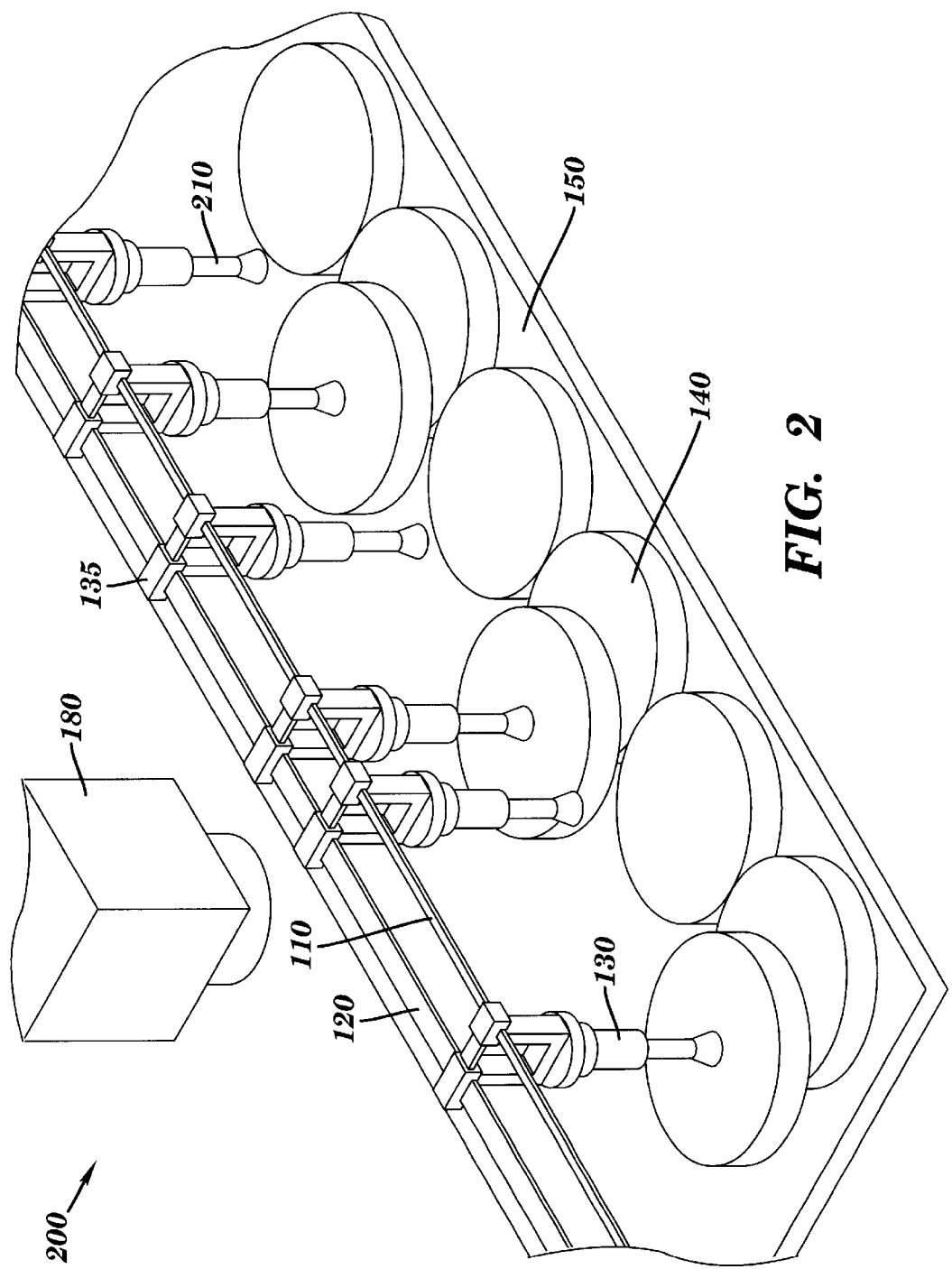
FIG. 2 is a perspective view showing a portion of FIG. 1 in greater detail.

In the embodiment depicted in FIG. 2, the end effector 210 includes a vacuum head which picks up a workpiece 140. The robotic device 130 subsequently reacquires the drive belt 120, so that the robotic device 130 and the workpiece 140 are moved along the track 120.

As shown in FIG. 1, at a designated point in the route, for example, at a second designated workstation 155, the robotic device 130 again optionally decouples from the drive belt 120, when, for example, coupling mechanism 135 releases drive belt 120, and its end effector 210 (FIG. 2) will again perform operations on the workpiece 140.

In the embodiment depicted in FIGS. 1 and 2, the end effector 210 vacuum head now places the workpiece 140 at an appropriate location on the second workstation 155, and the vacuum head of the end effector 210 releases the workpiece 140. The robotic device 130 subsequently reacquires the drive belt 120, when, for example, coupling mechanism 135 reattaches to drive belt 120, and the robotic device 130 is transported further along the track 120. In this manner, the robotic device 130 is once more ready to repeat the pick and place operation described supra, or any other operation suitable for a robotic device.

It should be noted that the drive belt 120 can maintain a high speed throughout the pick and place operation. This is possible because the robotic device 130 engages and disengages from the drive belt 120 when at an appropriate location, or when commanded to do so by a machine vision control system 180 or the like. This allows a plurality of robotic devices 130 to be in operation simultaneously. The net result is a dramatic increase in throughput for the process line, especially when compared to existing robotic systems.

Figure 3:
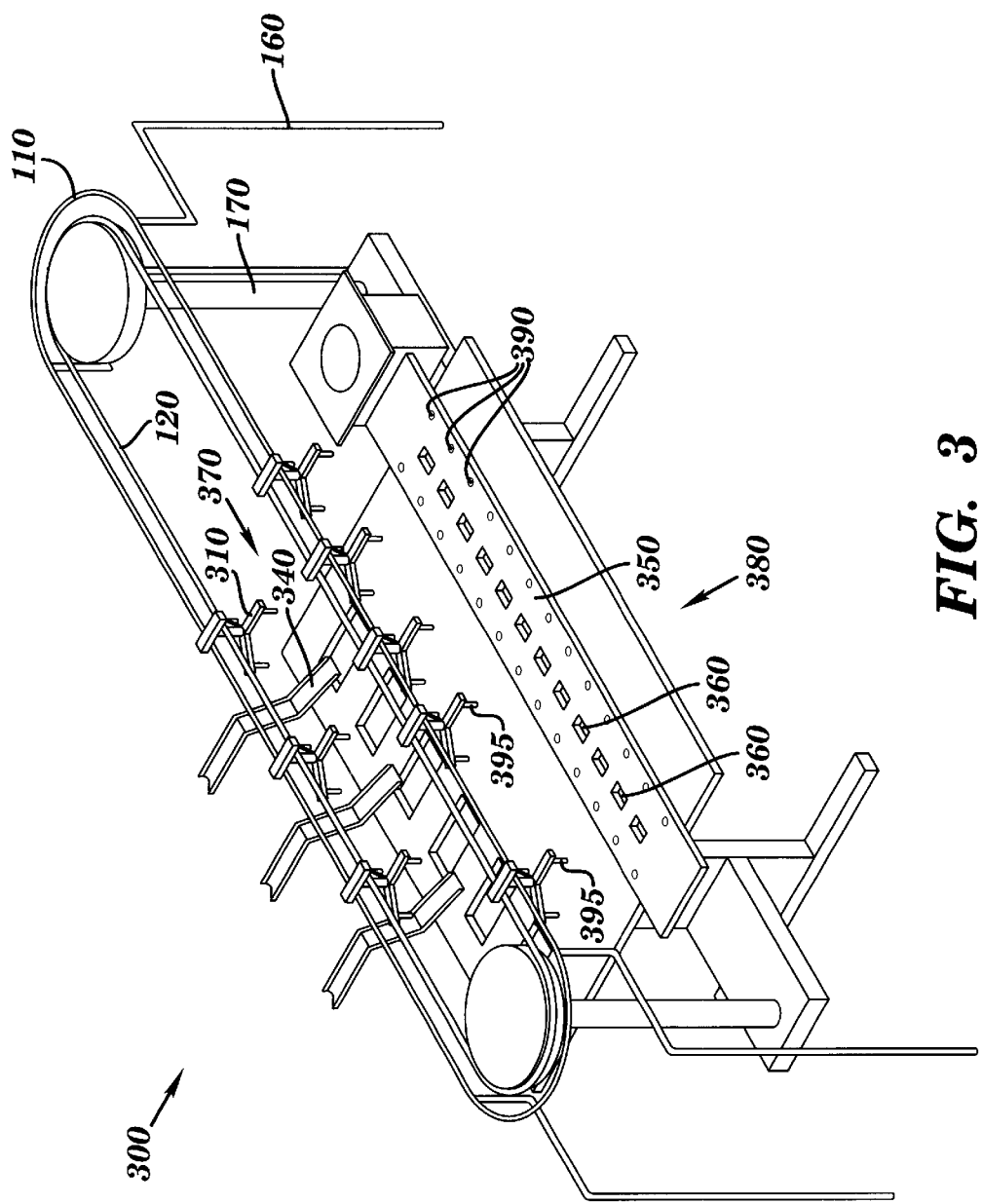
FIG. 3 is a perspective view of another embodiment of the multi-head tracked robot system capable of delivering numerous robotic devices to a task site of the present invention.

Referring now to FIG. 3, a second embodiment is illustrated, wherein each of the numerous robotic devices 130 includes an end effector docking/locking device 310 capable of independently performing complex operations or manipulations on a workpiece 340. The docking/locking device is further disclosed in U.S. patent application Ser. No. 09/824,300, filed concurrently, which patent application is hereby incorporated by reference. Each docking/locking device 310 is capable of stand alone operation when it is properly docked and locked to a workpiece 340, and the docking/locking device 310 may either receive command signals and power from the workstation, or from internal sources.

The embodiment shown in FIG. 3 is a novel automation device characterized by three important features, namely, high throughput, high precision, and a relatively long process setting time. In FIG. 3, individual docking/locking devices 310 are shuttled around a track 110 by a drive belt 120. The docking/locking devices 310 are able to pick objects (not shown) from trays 340 at a first workstation 370 and subsequently place them in openings 360 of component tray 350 at a second workstation 380. The docking/locking devices 310 are able to disengage from and reacquire the drive belt 120 at either workstation 370, 380. The docking/locking devices 310 are further able to temporarily dock to portions of the workstations 370, 380, by mating docking pins 395 to docking holes 390. Once docked at the workstation 370, 380 and locked into place, the docking/locking devices 310 are able to perform any robotic manipulation necessary to further complete production of the device under assembly.

Figure 4A:
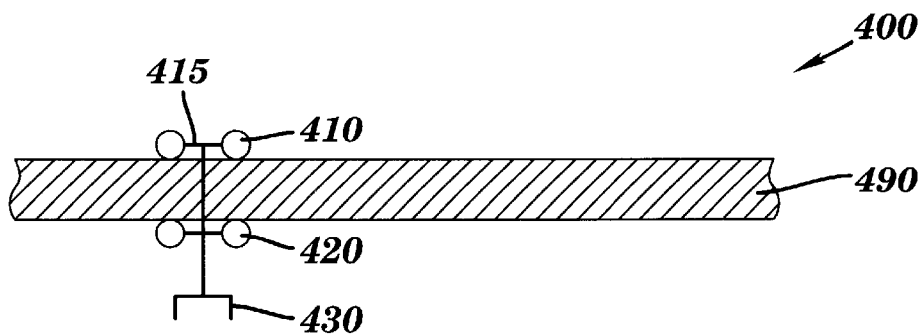
FIG. 4A is a side elevational view of a portion of an embodiment of the robotic device rigid track delivery system of the present invention.

Several alternative drive systems contemplated by the inventor will now be discussed. Referring to FIG. 4A, a first embodiment 400 is illustrated. This embodiment 400 incorporates a track 490 (e.g., railroad track, I-beam, etc.), and riding on the track 490 is a truck 415 from which is suspended a robotic device 130, docking/locking device 310, or the like. The truck 415 also includes at least one first wheeled carriage 410 to facilitate movement of the truck 415 along the track 490. A second wheeled carriage 420 can be attached to ride along the opposite side of the track 415 from the first wheeled carriage 410. This configuration yields improved balance, and smoother operation, when the truck 415 moves along the track 490.

Figure 4B:
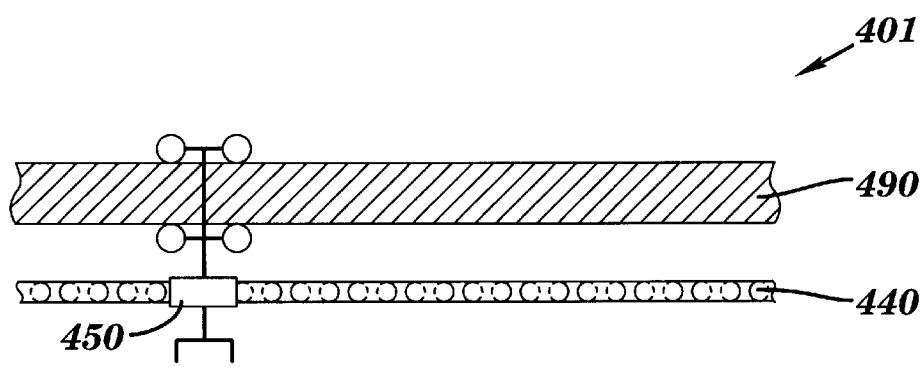
FIG. 4B is a side elevational view of a portion of another embodiment of the robotic device moving-chain delivery system of the present invention.

The embodiment 401 of the present invention illustrated in FIG. 4B builds on the concept of FIG. 4A. The embodiment 401 includes a drive chain 440 which engages the truck 415 via a drive gear or cog 450 which contains a clutch mechanism (not shown). Controlled movement of the drive chain 440 thus propels the truck 415. The truck 415 is thus equipped with a disconnect means (i.e., the drive gear or cog 450 containing a clutch mechanism) which allows the truck 415 to release or reacquire the drive chain 440 as necessary.

Figure 4C:
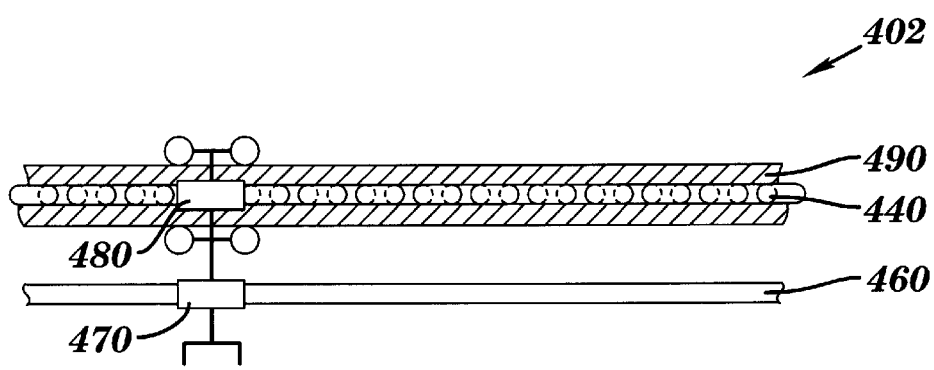
FIG. 4C is a side elevational view of a portion of a further embodiment of the robotic device dual-moving-chain delivery system of the present invention.
Figure 5:
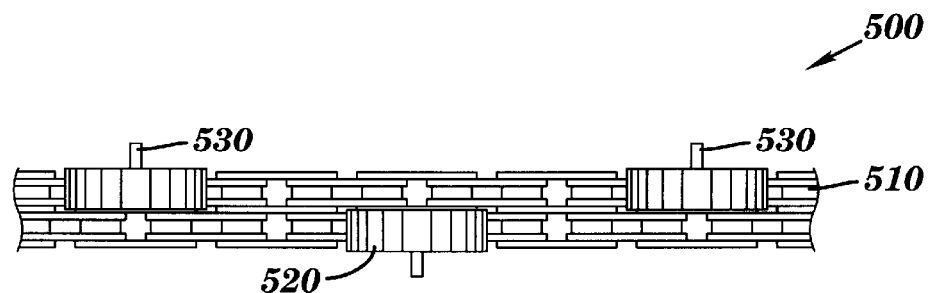
FIG. 5 is an overhead view of a portion of an embodiment of the robotic device double-wide-chain delivery system of the present invention.

FIG. 4C depicts another embellishment of the embodiment 401 of FIG. 4B. In this embodiment 402, a fixed chain 440 is added to the system. The fixed chain 440 is operatively connected to the truck 415 via a geared braking mechanism 480. The geared braking mechanism 480 permits the truck 415 to more positively stop when it approaches some desired position where it is to detach from the drive chain 440. In an alternative model, the fixed chain 440 can be geared to rotate an encoder shaft (not shown) to give positional feedback to the robotic system. Yet another embodiment 500 is shown in FIG. 5 wherein a double-linked drive chain 510 is used to provide two functions. First, one side of the double-linked drive chain 510 passes over support gears 530 which support the double-linked drive chain 510. Second, the robot drive gear 520 is used to propel a robot-laden truck 415.

Figure 6:
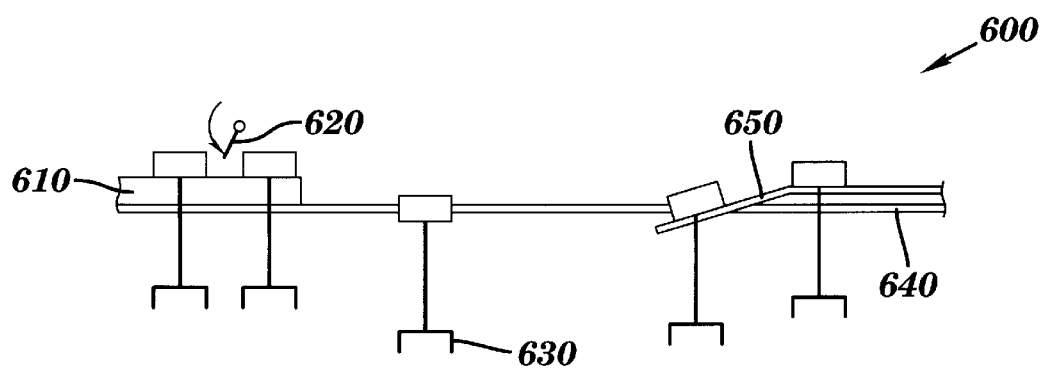
FIG. 6 is a side elevational view of a portion of a further embodiment of the robotic device drop/pinch cable delivery system of the present invention.

Referring now to FIG. 6, a drop/pinch cable drive system 600 for transporting robotic devices is shown. In this drive system 600, a moving cable 640, maintained in motion, is used to carry the robotic device carriers 630 in place of a drive chain or drive belt. In operation, a plurality of robotic device carriers 630 are positioned as ready spares in a wait zone 610. The robotic device carriers 630 are positioned above the cable 640. A pusher mechanism 620 is used to push a robotic device carrier 630 away from the wait zone 610 and onto the moving cable 640. Once on the moving cable 640, the robotic device carrier 630 operates as explained supra regarding the multi-head tracked robot system 100. At such time as it becomes desirable to remove a robotic device carrier 630 from the moving cable 640 (e.g., for maintenance, no further use, etc.) the robotic device carrier 630 is guided to an unload zone 650. The unload zone 650 includes a ramp or other means for removing the robotic device carrier 630 from the moving cable 640. In an alternative embodiment (not shown) of this model, a track is used to support the weight of the robotic device carrier 630, and the robotic device carrier 630 includes a pinching mechanism to grip the moving cable 640. Another alternative embodiment (not shown) utilizes a plurality of parallel cables to provide additional structural support and/or room for additional robotic device carriers 630.

Figure 7:
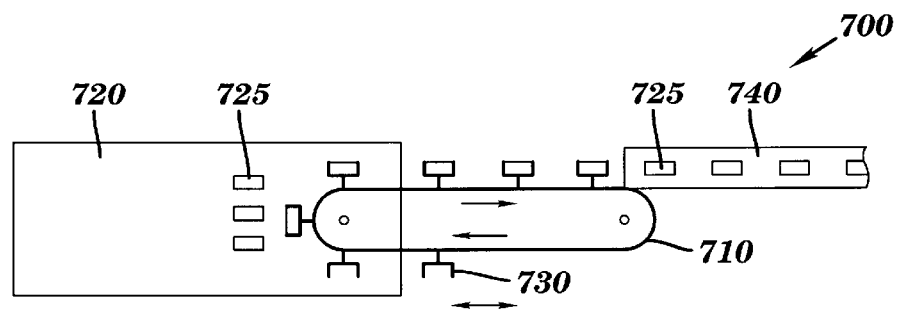
FIG. 7 is a plan view of a portion of another embodiment of the robotic device delivery system of the present invention adapted for trailer unloading.

The illustrations of FIGS. 7, 8, 9A, 9B, 9C, and 9D represent versions of the invention adapted for the unloading of the contents of a cargo trailer 720. In FIG. 7, a multi-head tracked robot system 700, of the present invention, is shown which is capable of delivering numerous robotic devices 730 to the interior of cargo trailer 720 via a track, moving cable, or the like 710. As described, supra, each of the robotic devices 730 is capable of picking a single package 725 and placing it on a conveyor or workstation 740. For instance, the robotic devices 130 may have grippers or suction cups that are faced externally to the track loop. A vision system may be used to guide the robotic devices 130 to the proper package to pick. Gripper types can be assigned to ensure the best match between gripper type and package to be picked.

Also in this embodiment is the capability to move the entire multi-head tracked robot system 700 in three (X, Y, Z) dimensions, namely horizontally, from side to side within, and into and out of, the interior of the cargo trailer 720, and vertically within the interior. This allows the multi-head tracked robot system 700 to clear packages 725 from anywhere within the cargo trailer. The entire robot system 700 can be placed on rollers or wheels to facilitate this movement.

Figure 8:
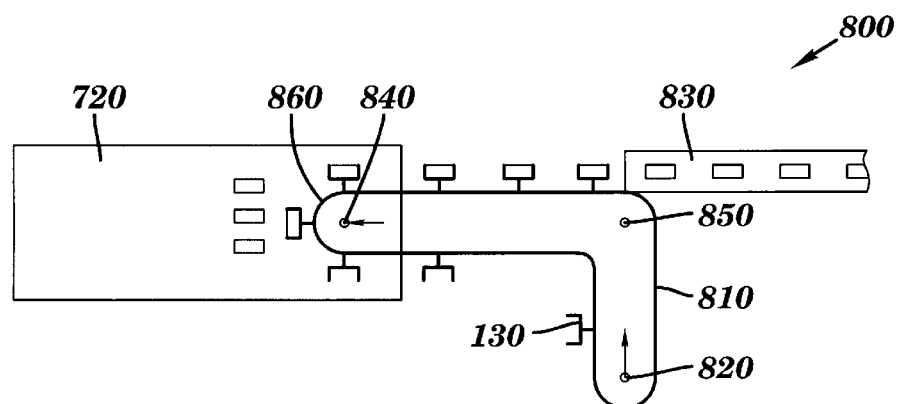
FIG. 8 is a plan view of a portion of yet another embodiment of the robotic device delivery system of the present invention adapted for trailer unloading.

A modification to the apparatus of FIG. 7 is shown in FIG. 8. The apparatus 800 is similar to that discussed regarding FIG. 7, except that FIG. 8 includes moveable spindles 820, 840 which are moved forward and backwards, enabling the picking end 860 of the multi-head tracked robot system 800 to move into and out of the cargo trailer 720.

Another alternate embodiment of FIG. 7 is presented in FIGS. 9A, 9B, 9C, and 9D. Rotating spindle 960 has a relatively fixed location, while rotating spindles 920, 940, and 950 do not have a fixed location, i.e., they can move forward and backward, thereby allowing the multi-head tracked robot system 910 to move into (e.g. FIG. 9B) and out of (e.g. FIG. 9C) the cargo trailer 720. Rotating spindles 920 and 960 act in combination to provide a method of taking up slack in the drive belt or chain 915.

Figure 9A:
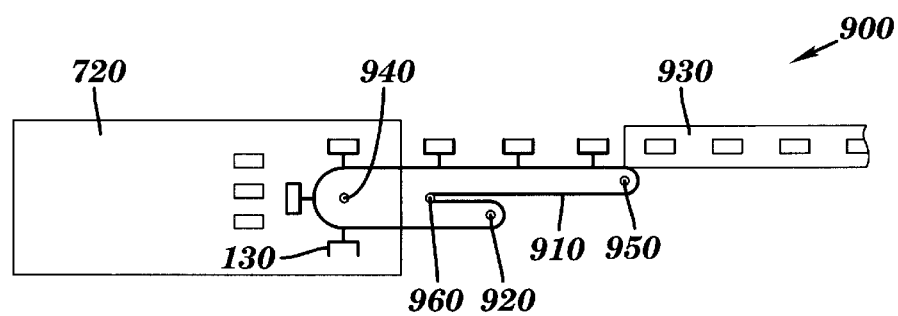
FIG. 9A is a plan view of a portion of another embodiment of the robotic device delivery system of the present invention adapted for trailer unloading.
Figure 9B:
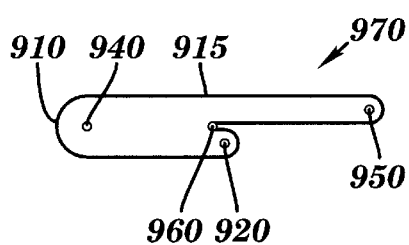
FIG. 9B is a detail view of a portion of FIG. 9A.
Figure 9C:
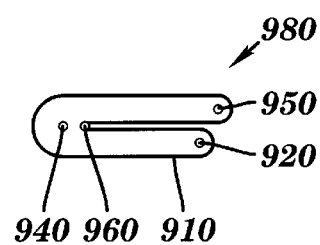
FIG. 9C is another detail view of a portion of FIG. 9A.
Figure 9D:
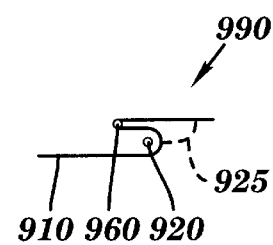
FIG. 9D is still another detail view of a portion of FIG. 9A.

FIG. 9D represents a method of bypassing spindle 960 by using a jumper 925 from spindle 920 to belt portion. The jumper 925 is useful to avoid having the drive belt or chain 915 jog in one direction and immediately jog in the other direction while the drive belt or chain 915 reverses direction.

Figure 10A:
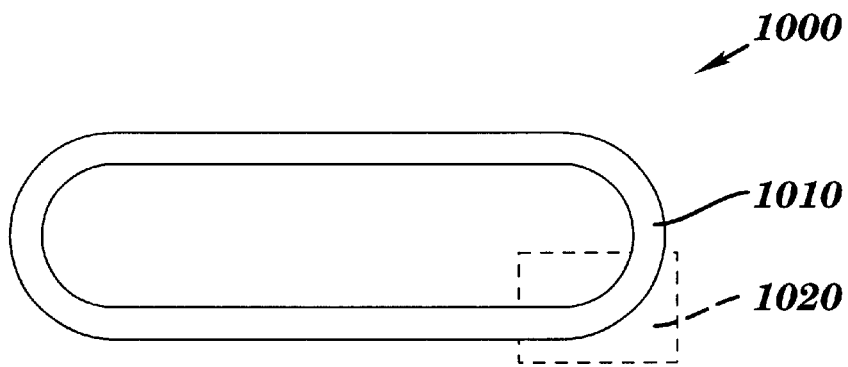
FIG. 10A is a plan view of a portion of another embodiment of the robotic device switchable-track delivery system of the present invention.
Figure 10B:
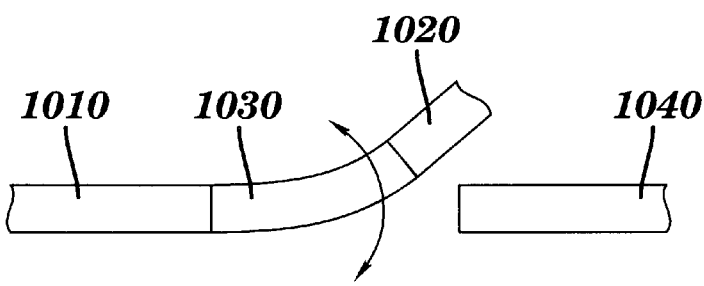
FIG. 10B is a detail view of a portion of FIG. 10.
Figure 10C:
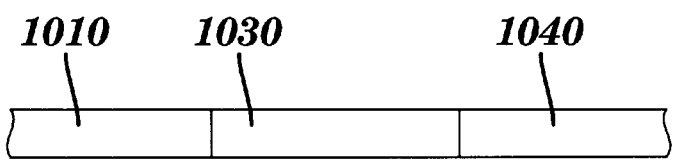

Still another alternative embodiment is shown in FIGS. 10A, 10B, and 10C. This embodiment 1000 includes a guide track 1010 upon which the robotic devices 130 (FIG. 1) move. At least one area 1020 of guide track 1010 includes a portion 1030 that is hingedly movable so as to allow branching of the guide track 1010, which permits rerouting of robotic devices 130 onto a second guide track 1040.

Figure 11A:
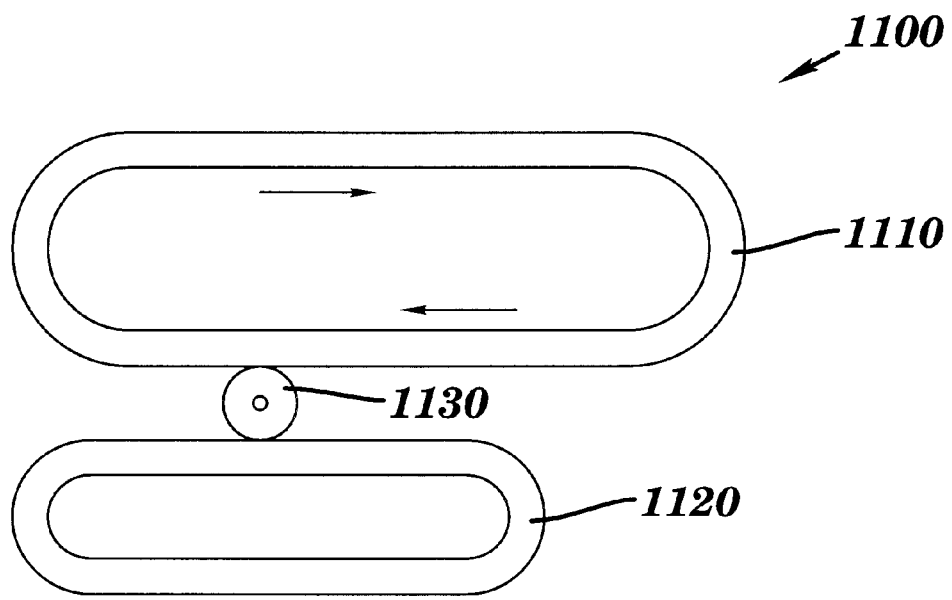
FIG. 11A is a plan view of a portion of another embodiment of the robotic device delivery system of the present invention employing multiple cable/chain loops.

Referring now to FIG. 11, there is shown an embodiment 1100 utilizing a first guide track 1110 with a first drive chain (not shown) operating below it. A drive gear 1130, mounted on the robotic device, operatively and simultaneously connects this first guide track 1110 and first drive chain to a second guide track 1120 and a second drive chain (not shown). The gear teeth and the speed of the drive gear 1130 ensure that the first and second drive chains operate at the same speed.

Figure 11B:
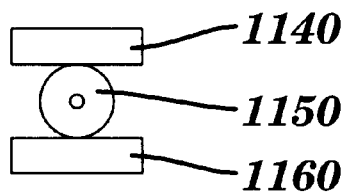
FIG. 11B is a detail view of a portion of FIG. 11A.

This embodiment 1100 (FIG. 11) also includes two track supporting guides 1140, 1160 mounted on the robotic device (not shown) which enable gear 1150 to catch and release either of the first or second guide tracks 1110, 1120, respectively, as shown in FIG. 11B. Thus, the robotic device (not shown) can use each parallel track for support, and can switch from moving along the first guide track 1110 to moving along the second guide track 1120.

Figure 12:
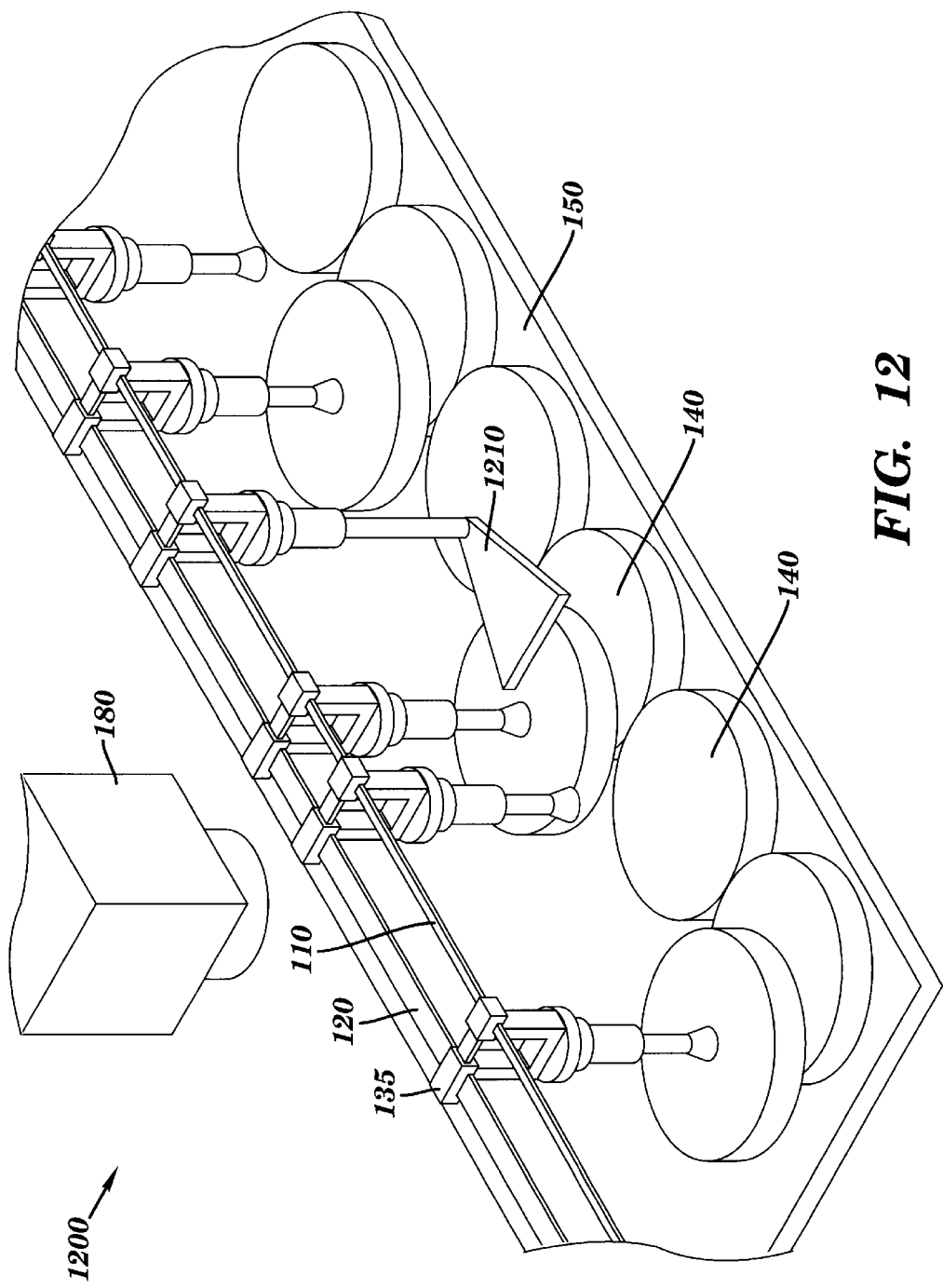
FIG. 12 is a perspective view of another embodiment of the multi-head tracked robot system capable of delivering numerous robotic devices, equipped with a spatula end effector, to a task site.

The embodiment 1200 of FIG. 12 is similar to that of FIG. 2, except that FIG. 12 illustrates a spatula-type gripper 210.

When used as an end effector, the spatula-type gripper 210 is useful for lifting up fragile items (e.g., cookies or candies) which may otherwise be damaged, particularly when the end effector does not come to a complete stop while picking the item.

Figure 13:
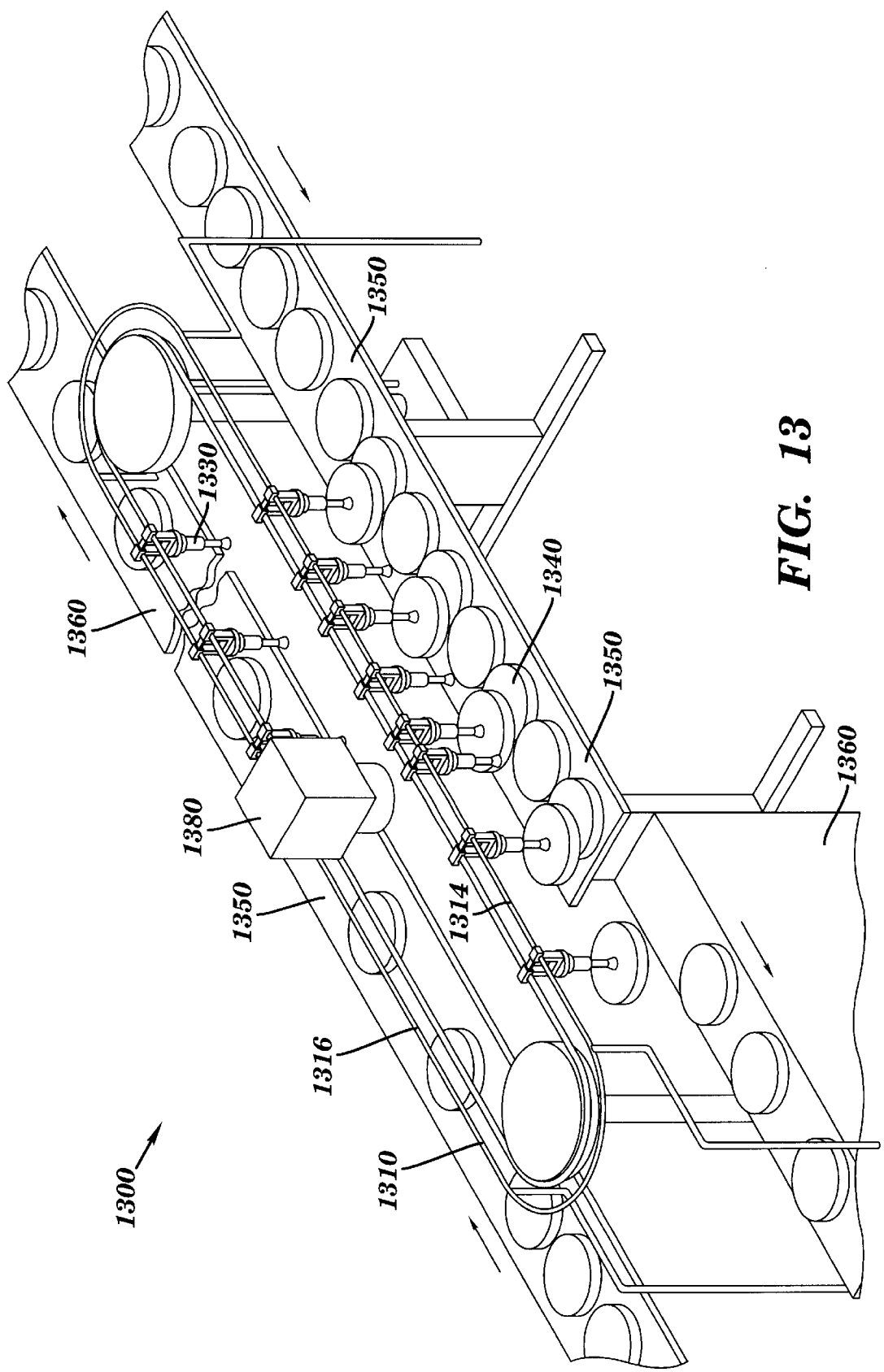
FIG. 13 is a perspective view of another embodiment of the multi-head tracked robot system capable of delivering numerous robotic devices to more than one task site.

The embodiment 1300 depicted in FIG. 13 is that of a multi-head tracked robot system 1310 which utilizes both sides 1314, 1316 of the track. In a typical operating mode, incoming items 1340 to be singulated are scanned by a machine vision system (e.g., a line scan camera). Next, the items 1340 are conveyed, by incoming conveyors 1350, under the robotic devices 1330, which pick some or all of the items 1340 and place them on the outgoing conveyors 1360.

Figure 14:
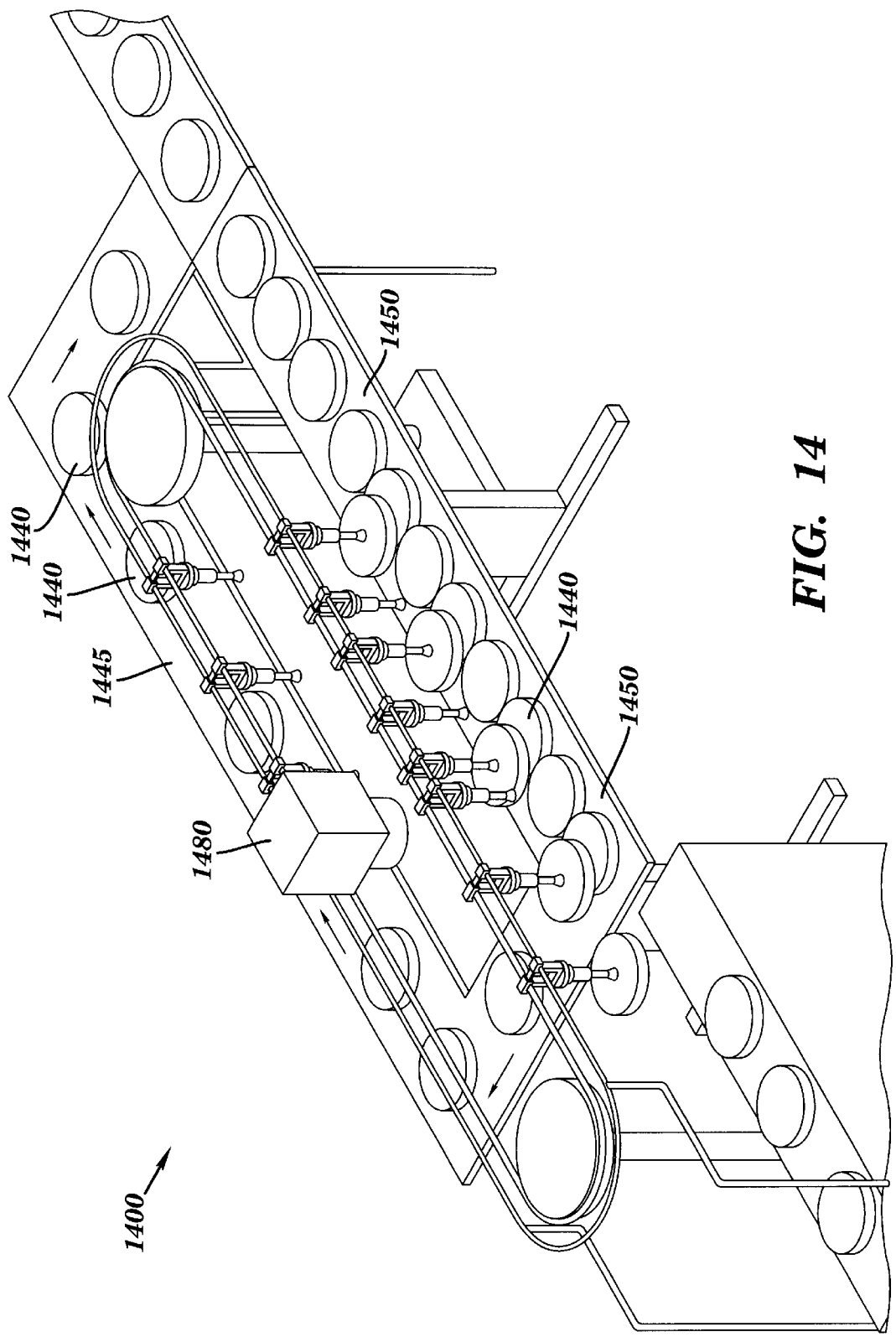
FIG. 14 is a perspective view of another embodiment of the multi-head tracked robot system capable of delivering numerous robotic devices in a recirculation scheme.

Under certain circumstances, it is necessary to use a processing technique called "recirculation" to deal with a plurality of items which are piled too deeply for the initial vision system scan to determine where all of the items are located. FIG. 14 illustrates one example of this. In the embodiment 1400, a conveyor 1450 is configured to recirculate the items 1440 back to the initial scanning location 1480. The recirculation model may include a second vision system (not shown) as well as the picking of items 1440 from the recirculation side 1445 of the conveyor 1450, for higher overall efficiency.

Figure 15:
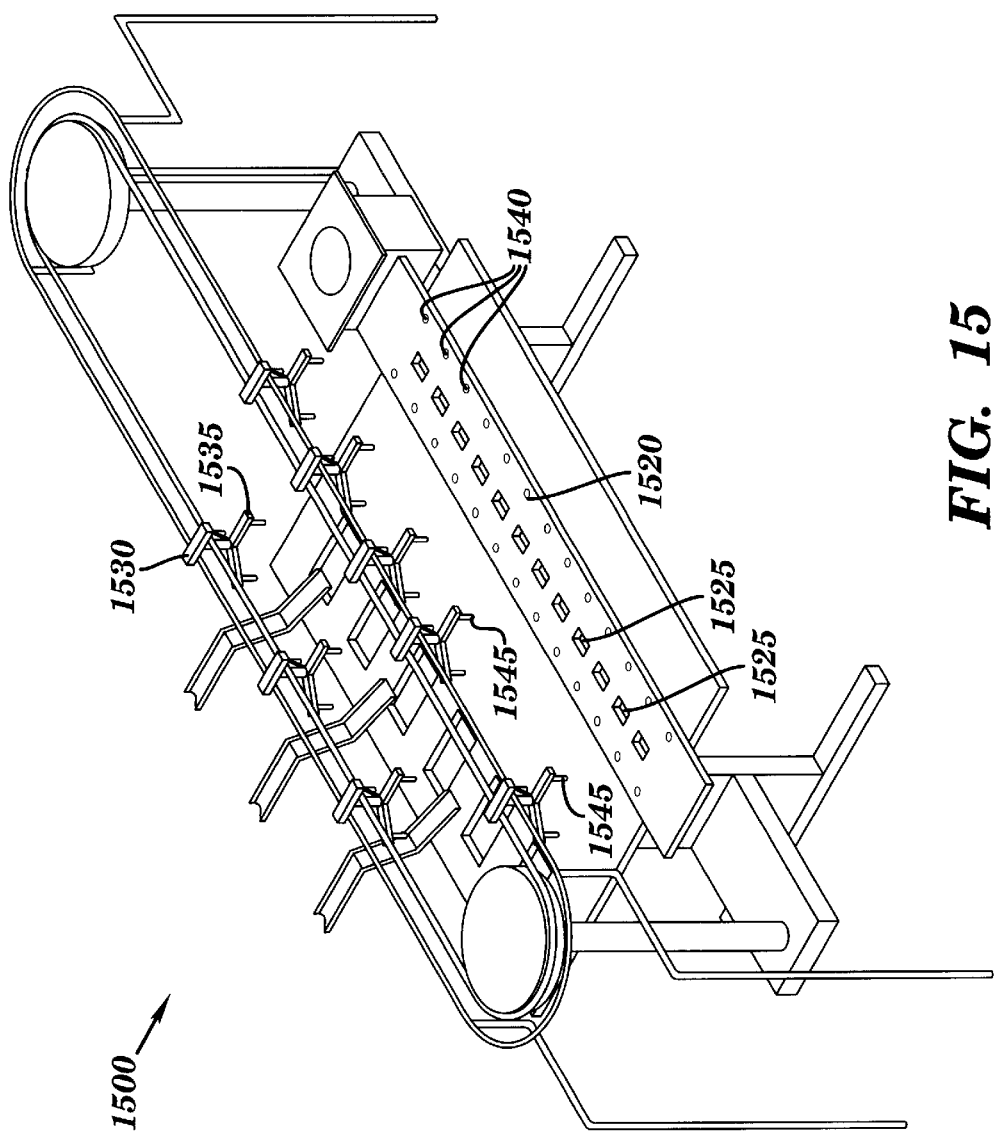
FIG. 15 is a perspective view of another embodiment of the multi-head tracked robot system capable of delivering numerous robotic devices in a laboratory automation environment.

Two laboratory automation schemes are represented by FIG. 15. In FIG. 15, the feet 1535 of the robotic device 1530 are docked to a tray 1520 of a plurality of wells 1525. The tray 1520 be one of a plurality of trays situated in a pallet (not shown). The robotic devices 1530 will dock to the tray 1520 or pallet by mating docking pins 1545 to docking holes 1540. Once the robotic device 1530 or devices have docked to the tray 1520 or pallet, the robotic devices 1530 can dispense simultaneously into the wells 1525. The robotic devices 1530 are then refilled on the opposite side of the multi-head tracked robotic system 1500.

In a second, similar, laboratory automation scheme, newly filled robotic devices 1530 are cycled in to the filling station, while empty robotic devices 1530 are cycled to the opposite side of the multi-head tracked robotic system 1500 where they are refilled.

While preferred and particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A material handling system comprising:
   at least one material handling device;
   at least one track for transporting said material handling device;
   a plurality of workstations located along the track; and
   wherein said material handling device is a robotic device capable of independent operation when not connected to said track and wherein each material handling device is removably coupled to the track while the track remains in motion.

2. The material handling system of claim 1, further comprising:
   a machine vision system for monitoring the location and movement of the material handling device;
   a drive system for propelling the material handling device along the track; and
   a speed regulating system for controlling the speed of the drive system.

3. The material handling system of claim 2, wherein said drive system is operationally coupled to said track and to said material handling device, and said drive system is characterized by a transporting device selected from the group consisting of a chain, belt or cable.

4. The material handling system of claim 1, wherein said material handling device is capable of operationally coupling to at least one of the plurality of workstations.

5. The material handling system of claim 1, further comprising:
- a track guide element for routing said at least one material handling device, wherein said track guide element has a closed-loop configuration, and said closed-loop configuration may be altered to an open-loop configuration;
- a conveyor track for transporting the material handling device, said conveyor track operably positioned with said track guide element;
- at least one material handling device removably attached to said conveyor track and said guide element;
- a drive system for maintaining the speed of the conveyor track; and
- a coupling mechanism operationally attached to the material handling device which allows the material handling device to disengage or engage the conveyor track and the guide element.

6. The material handling system of claim 5, wherein said track guide element has a first closed-loop configuration, and said first closed-loop configuration may be altered to produce a second closed-loop configuration while maintaining the track guide element in a closed-loop configuration.

7. The material handling system of claim 5, further comprising a second track guide element, wherein said first guide track element and said second guide track element are operationally connected, to allow the transfer of a material handling device from the first guide track element to the second guide track element.

8. The material handling system of claim 5, further comprising a device for removing said material handling device from said conveyor track and said guide element.

9. The material handling system of claim 5, further comprising a device for introducing a material handling device to the conveyor track and said guide element.

10. The material handling system of claim 5, further comprising:
- a wait zone, adapted for storage of material handling devices prior to the material handling devices being attached to said conveyor track; and
- an unload zone, adapted for receiving material handling devices removed from said conveyor track.

11. The material handling system of claim 10, further comprising a device for shuttling said material handling devices from said unload zone to said wait zone.

12. The material handling system of claim 10, wherein said track guide element includes a truck, having at least one wheeled carriage, to which is releasably attached a material handling device.

13. The material handling system of claim 12, wherein said track guide element includes a drive chain.

14. The material handling system of claim 13, wherein said drive chain engages the truck via a device selected from the group consisting of a drive gear or a cog.

15. The material handling system of claim 14, wherein said drive chain engages the truck via a device equipped with a disconnect device.

16. The material handling system of claim 15, wherein said disconnect device is a clutch.

17. The material handling system of claim 15, wherein said disconnect device is a gear braking mechanism.

18. The material handling system of claim 13, wherein said track guide element includes a double-linked drive chain.

19. The material handling system of claim 5, further comprising a positional feedback device operationally coupled to said conveyor track.

20. The material handling system of claim 19, wherein the positional feedback device is an encoder.

21. The material handling system of claim 19, wherein the conveyor track is a drop-pinch cable system.

22. The material handling system of claim 19 comprising:
- at least one material handling device removably attached to said track guide element, said material handling device capable of propelling itself along said track guide element; and
- a coupling mechanism operationally attached to the material handling device which allows the material handling device to disengage or engage the track guide element.

23. A material handling system comprising:
- a plurality of independently operable material handling devices;
- at least one continuously moving track for transporting said material handling devices;
- a drive system for maintaining said track at a constant speed;
- a plurality of workstations located along the route traversed by the track; and
- wherein each material handling device further comprises a device for removably attaching the material handling device to the track when the track is continuously moving at said constant speed.

* * * * *